US010024433B2

(12) United States Patent
Lenz et al.

(10) Patent No.: US 10,024,433 B2
(45) Date of Patent: Jul. 17, 2018

(54) CRANKSHAFT SEAL FLANGE

(71) Applicant: KACO GmbH + Co. KG, Heilbronn (DE)

(72) Inventors: Roland Lenz, Untereisesheim (DE); Andre Werner, Leingarten (DE); Jochen Bantel, Bretzfeld (DE); Joachim Schöck, Bietigheim-Bissingen (DE)

(73) Assignee: KACO GmbH + Co. KG, Heilbronn (DE)

( * ) Notice: Subject to any disclaimer, the term of this patent is extended or adjusted under 35 U.S.C. 154(b) by 0 days.

(21) Appl. No.: 15/351,631

(22) Filed: Nov. 15, 2016

(65) Prior Publication Data

US 2017/0138481 A1 May 18, 2017

(30) Foreign Application Priority Data

Nov. 16, 2015 (DE) .................. 20 2015 007 951 U

(51) Int. Cl.

| | |
|---|---|
| *F02P 7/067* | (2006.01) |
| *F02P 7/07* | (2006.01) |
| *F16J 15/326* | (2016.01) |
| *G01P 3/44* | (2006.01) |
| *F16J 15/3252* | (2016.01) |
| *F16J 15/3204* | (2016.01) |
| *G01P 3/00* | (2006.01) |

(52) U.S. Cl.
CPC ........... *F16J 15/3252* (2013.01); *F02P 7/067* (2013.01); *F02P 7/07* (2013.01); *F16J 15/3204* (2013.01); *F16J 15/326* (2013.01); *G01P 3/00* (2013.01); *G01P 3/443* (2013.01)

(58) Field of Classification Search
CPC ........ F02P 7/067; F02P 7/0672; F02P 7/0675; F02P 7/07; F16J 15/3204–15/324; F16J 15/3252; F16J 15/3256; F16J 15/326; F16J 15/3264; G01P 3/42; G01P 3/44; G01P 3/443
USPC ....... 123/406.58–406.66; 277/358, 370, 371, 277/375, 380, 381
See application file for complete search history.

(56) References Cited

U.S. PATENT DOCUMENTS

| | | | | |
|---|---|---|---|---|
| 4,653,458 | A * | 3/1987 | Bergsten | F02P 7/0677 123/146.5 A |
| 5,152,538 | A * | 10/1992 | Mims | F16J 15/3232 123/198 E |
| 6,250,637 | B1 * | 6/2001 | Oricchio, Jr. | F02F 11/007 277/317 |
| 6,345,825 | B1 * | 2/2002 | Guth | G01P 3/443 277/317 |

(Continued)

FOREIGN PATENT DOCUMENTS

| | | |
|---|---|---|
| CN | 203703137 | 7/2014 |
| EP | 1063455 | 12/2000 |

*Primary Examiner* — Erick Solis
(74) *Attorney, Agent, or Firm* — Gudrun E. Huckett

(57) ABSTRACT

A crankshaft seal flange has a support made at least partially of a plastic material. The support has a passage with an inner wall. The support has at least one dynamic seal that extends about a circumference of the inner wall of the passage. At least one sensor is provided that detects crankshaft rotary speed and crankshaft position. The at least one sensor encompasses an electronic component group that is integrated into the plastic material of the support.

10 Claims, 3 Drawing Sheets

(56) References Cited

U.S. PATENT DOCUMENTS

| | | | |
|---|---|---|---|
| 6,533,286 B1* | 3/2003 | Eckel | F16J 15/3268 |
| | | | 277/549 |
| 6,561,518 B1* | 5/2003 | Lutaud | F02F 11/007 |
| | | | 277/549 |
| 6,605,938 B1* | 8/2003 | Sentoku | F16C 33/78 |
| | | | 324/174 |
| 7,334,555 B2* | 2/2008 | Bauer | G01M 15/046 |
| | | | 123/195 R |
| 7,694,976 B2* | 4/2010 | Matsui | F16C 9/02 |
| | | | 277/317 |
| 2003/0056609 A1 | 3/2003 | Gorg et al. | |
| 2005/0230920 A1* | 10/2005 | Toth | F16J 15/326 |
| | | | 277/317 |
| 2007/0104402 A1 | 5/2007 | Koyagi et al. | |

* cited by examiner

CRANKSHAFT SEAL FLANGE

BACKGROUND OF THE INVENTION

The invention concerns a crankshaft seal flange comprising a support, comprised at least partially of plastic material and comprising at least one dynamic seal that extends about the circumference of an inner wall of a passage of the support, and comprising at least one sensor, provided for detecting the rotary speed and the position of the crankshaft, which is comprised substantially of an electronic component group.

Crankshaft seal flanges serve for sealing crankshafts in motor vehicles. The seal flanges are screwed onto the corresponding crankshaft housing. The crankshaft is extending through the passage of the support of the seal flange and the dynamic seal is resting seal-tightly against its circumference. In order to detect the rotary speed as well as the position of the crankshaft, the seal flange is provided with a sensor which is interacting with a trigger wheel that is fixedly seated on the crankshaft. The sensor is a separate component that is screwed onto the support. In order for the sensor to assume an exact position, a radial guide for the sensor is provided on the support and is located in one lateral face of the seal flange and extends into the inner wall of the support. When the sensor is mounted, between it and the sidewall of the guide a gap remains that is extending from the inner wall of the support in outward direction.

Since the sensor is screwed onto the support, it is complicated to position the sensor in an exact position relative to the seal flange or the support because, when tightening the screw, it cannot be prevented that the position of the sensor, that is affected by tolerances anyway, changes radially, tangentially as well as axially. Also, the sensor connection is sensitive to vibrations and shocks so that the measuring precision can be impaired. For connecting the sensor to the seal flange, connecting elements are required that not only make the manufacture of the seal flange more expensive but also lead to a cumbersome and complex assembly. The screws as well as the centering bushing on the sensor are required as connecting elements. On the seal flange. a threaded centering insert must be provided into which the screw is screwed for fastening the sensor.

Over time, the radially extending gap between the guide wall and the sensor causes deposits to be formed in this area which are undesirable in use of the seal flange. Also, by means of this radial gap, dirt from the exterior can be introduced into the seal flange. The connecting elements cause the sensor area to have a certain size and accordingly require a large installation space. Due to the radial gap, swirls are generated in the area of the sensor when the seal flange is in use so that the measuring precision and the sealing function are impaired.

The invention has the object to configure the crankshaft seal flange of the aforementioned kind in such a way that, while providing a simple and inexpensive manufacture, a reliable measuring action of the sensor as well as a reliable testing of the seal tightness of the seal flange are enabled.

SUMMARY OF THE INVENTION

This object is solved for the crankshaft seal flange of the aforementioned kind in accordance with the invention in that the electronic component group of the sensor is integrated into the plastic material of the support.

In the crankshaft seal flange according to the invention, the sensor is not a separate component that must be mounted by connecting elements on the seal flange. Instead, the sensor or its electronic component group is integrated into the plastic material of the support. Since the component group is embedded in the plastic material, it is provided on the seal flange so as to be protected. The electronic component group and thus the sensor can be provided with high radial, tangential and axial precision on the seal flange. The integration of the sensor or its electronic component group is characterized by a very high insensitivity to vibrations and shocks, which contributes to high measuring precision.

Since the electronic component group is integrated into the plastic material, no guides and the like must be provided on the support in order to achieve positional alignment of the sensor. The configuration according to the invention leads to a compact configuration of the seal flange that therefore can be used even when the available installation space in the respective vehicle is small.

Advantageously, the electronic component group is inserted in preassembled form into the injection molding tool when producing the seal flange by injection molding and subsequently the plastic material is injected. The seal flange, when removed from the injection molding tool, therefore comprises, already integrated, the electronic component group.

Since no guide is required anymore for the precise positioning of the sensor, the passage of the support can advantageously be provided with a circumferentially closed wall section that is adjoined by a circumferentially extending flat annular surface in one lateral face of the support. In this way, for example, radially extending gaps are avoided which open into the inner wall of the passage. In this way, in a simple way receiving spaces are avoided in which the deposits can be formed during use of the seal flange. Moreover, the closed wall section of the passage and the closed annular surface in particular have the advantage that a seal tightness test by means of an overpressure bell is possible in a reliable and simple way. As a result of the closed surfaces, the overpressure bell can be attached in a seal-tight way such that across the entire circumference a proper sealing action is provided. When the overpressure is applied during testing, there is no longer the problem that the air can be discharged accidentally in outward direction through gaps that are opening into the inner wall of the passage. Therefore, when during the test a pressure loss occurs within the measuring time, then this is a reliable indication that the seal flange is leaking.

The electronic component group is arranged within the support such that the spacing relative to the inner side of the support is so small that the sensor can interact with the trigger wheel on the crankshaft. The electronic component group is thus also protected and sealed relative to the inner wall of the support.

The sensor has advantageously a bushing part projecting away from the support into which a plug of a sensor cable can be pushed with which the sensor signals can be supplied to a control device, for example, a motor control device.

The bushing part is also monolithically formed together with the support and is preferably provided by injection molding on the support.

Advantageously, the electronic component group extends into a base member from which the bushing part is projecting away. The base member is embodied solid and protects reliably the electronic component group.

When the base member is at least approximately extending across the axial width of the support, this contributes advantageously to a safe protection and to reliable fastening of the electronic component group.

The dynamic seal with which the seal flange is resting seal-tightly against the crankshaft can be made of suitable plastic materials, advantageously of polyfluorocarbon, preferably of polytetrafluoroethylene. This material has only minimal friction coefficients so that a long service life of the seal flange is ensured.

However, the dynamic seal can also be comprised of elastomeric materials, for example, in the form of a flat-contact lip seal, or a classic lip seal configuration (sealing edge with spring force assistance).

In order to ensure a static sealing action of the seal flange on the crankcase, it is advantageous when the seal on the lateral face which is facing the crankcase has at least one static seal. With it, the seal flange is reliably sealed relative to the crankcase.

The support itself is comprised advantageously of high-performance thermoplastic materials or thermosetting resins.

As high-performance thermoplastic materials, PPS, suitable polyamides or PPA are conceivable, for example. As thermosetting resins, advantageously phenolic resins are well suited. The thermoplastic materials and thermosetting resins each are composites, i.e., depending on the application, they contain, for example, glass or carbon fibers, mineral fillers and the like The sensor can transmit its sensor signals by cables or wireless to a control device, preferably a motor control device.

The subject matter of the application not only results from the subject matter of the individual claims but also from all specifications and features disclosed in the drawings and the description. They are claimed as important to the invention, even if they are not subject matter of the claims, inasmuch as they are novel, individually or in combination, relative to the prior art.

Further features of the invention result from the further claims, the description, and the drawings.

BRIEF DESCRIPTION OF THE DRAWINGS

The invention will be explained with the aid of an embodiment illustrated in the drawings in more detail. It is shown in.

DESCRIPTION OF THE PREFERRED EMBODIMENTS

Figure 1:
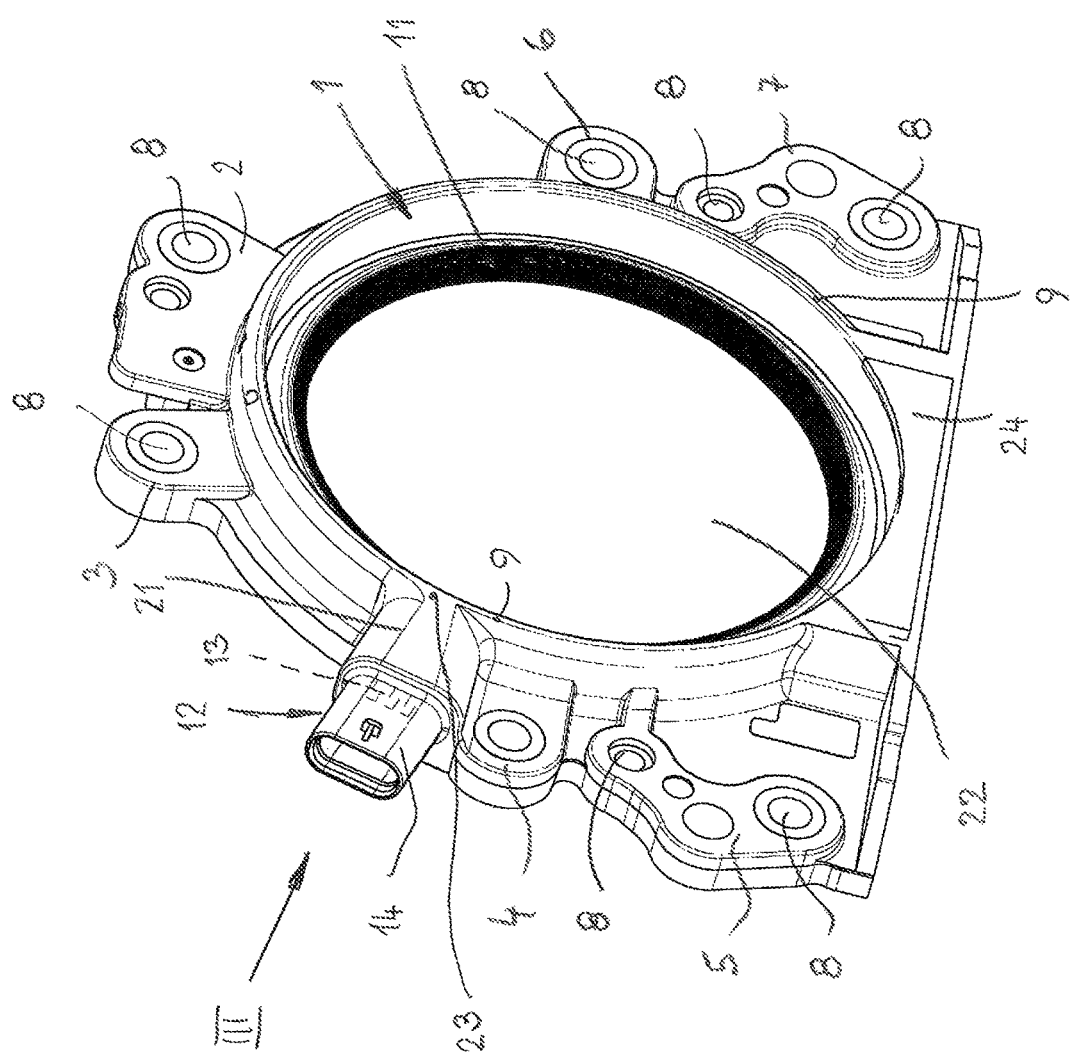
FIG. 1 in perspective illustration a crankshaft seal flange according to the invention.

The seal flange serves for sealing passenger car and truck crankshafts at the front and rear. The seal flanges are screwed in known manner to the housings in which the crankshaft is rotatably supported.

The seal flange has an annular support 1 which is comprised of hard plastic material. As plastic materials for the support 1, for example, high-performance thermoplastic materials such as PPS, suitable polyamides or PPA, but also thermosetting resins are conceivable, such as phenolic resins. The high-performance thermoplastic materials as well as the thermosetting resins each are composites that, depending on the application, contain additives such as glass or carbon fibers, mineral fillers and the like.

Fastening points 2 to 7 are transversely projecting away from the support 1 and each are provided with at least one through opening 8 for screws with which the seal flange is screwed onto the crankcase. The arrangement and configuration of the fastening points 2 to 7 depends on the configuration of the respective crankcase. The embodiment and arrangement of the fastening tabs 2 to 7 illustrated in FIGS. 1 and 2 is therefore not to be viewed as limiting but only represents one possible embodiment.

On its lateral face (not illustrated) facing the crankcase, the seal flange or the support 1 is provided with at least one static seal that can be embodied as a seal ring and can extend about the circumference of the support 1. The static seal is fastened in a groove on the end face of the support 1 in a known way. Since such static seals on seal flanges for crankshafts are known, their configuration and arrangement is not described in detail.

The support 1 has a through opening 22 in which a dynamic seal 11 is arranged in a known manner. It extends about the circumference of the screw opening 22 and is contacting seal-tightly the crankshaft which is extending through the support 1. The dynamic seal 11 can be an elastomeric seal. Advantageously, the dynamic seal 11 is comprised of polyfluorocarbon, in particular of polytetrafluoroethylene. The dynamic seal 11 is comprised of friction-minimized materials so that the wear and the friction losses of the dynamic seal 11 are minimal and a long service life is ensured in this way.

Figure 2:
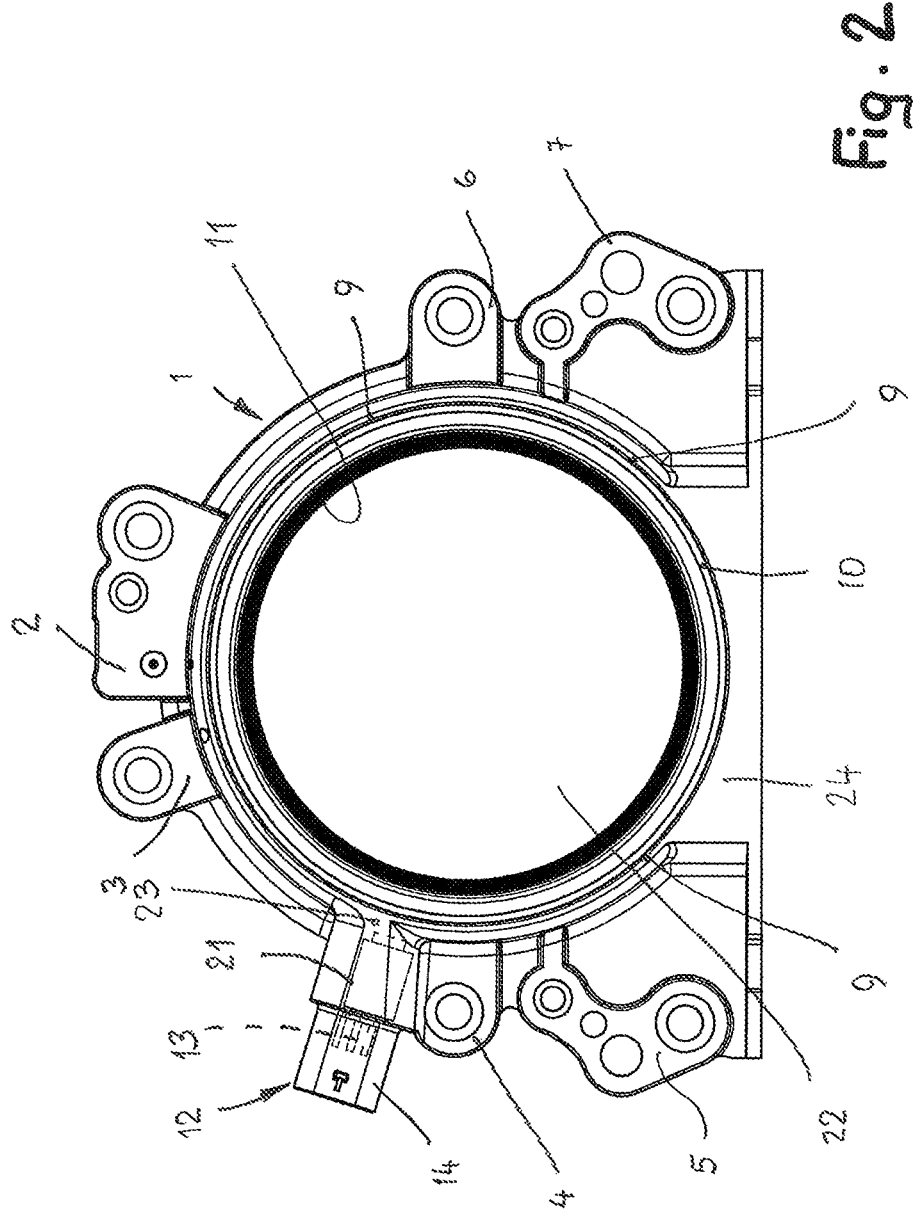
FIG. 2 the crankshaft seal flange according to the invention in a front view.

The through opening 22 has at the transition to the lateral face of the seal flange illustrated in FIGS. 1 and 2 a wall section 10 conically opening in radial outward direction and adjoined by a circumferentially extending flat annular surface 9 positioned in the lateral face. It has advantageously about most of its circumference the same radial width and is embodied to be wider in the sensor area 23 as well as in the base area 24 of the seal flange.

The annular surface 9, as a function of the shape and/or configuration of the seal flange, can also have a different configuration. The illustrated and described form of the annular surface is therefore not to be understood as limiting.

The seal flange is provided with a rotary speed and position sensor 12 (in the following referred to as sensor) which serves for motor control and interacts in a known manner with a trigger wheel that is fixedly seated on the crankshaft. The sensor 12 is comprised substantially of an electronic component group 13 which is integrated into the seal flange. When injection molding the seal flange, the electronic component group 13 is first inserted into the injection molding tool and subsequently embedded in the plastic material by the injection molding process. In the injection molding tool, appropriate positioning aids for the electronic component group 13 are arranged so that it is arranged exactly positioned in the injection-molded seal flange.

Figure 3:
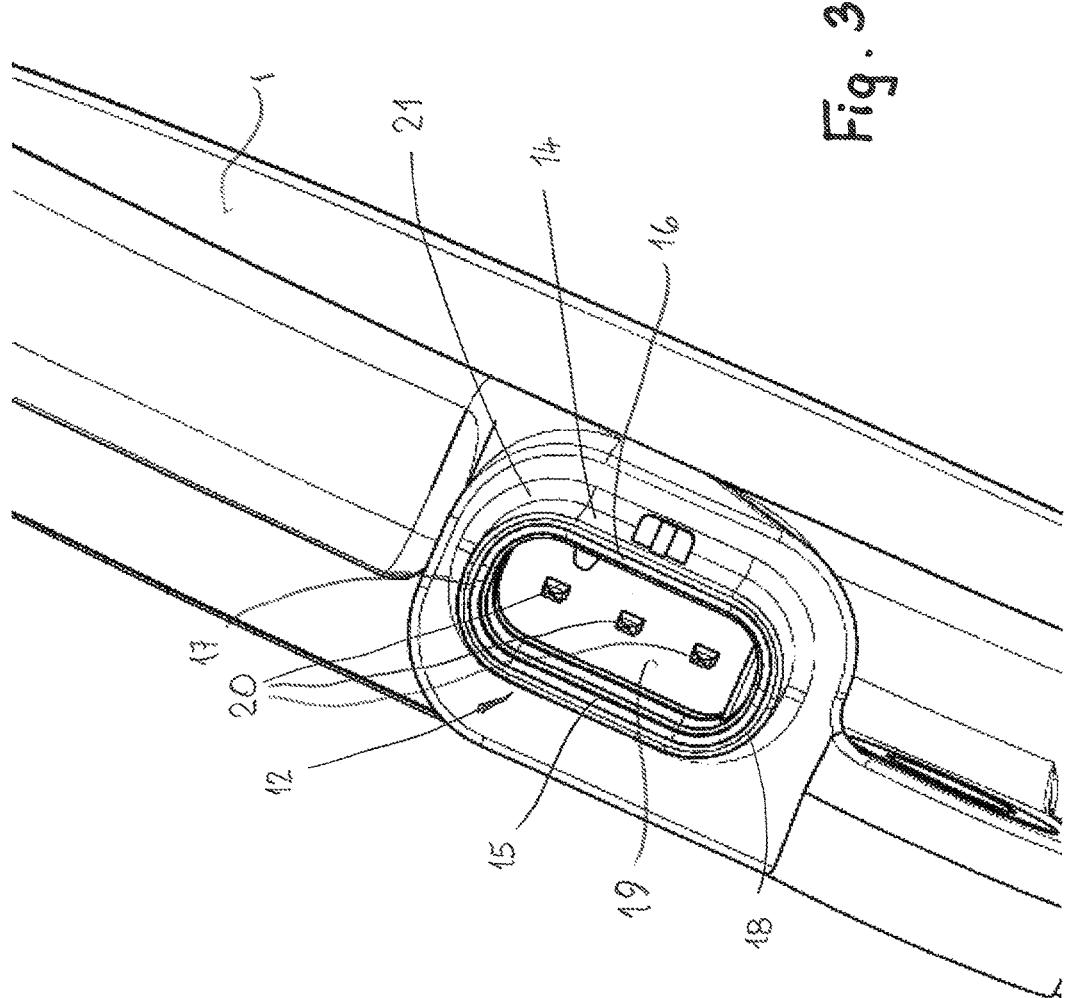
FIG. 3 in enlarged and perspective illustration, the sensor input of the crankshaft seal flange according to the invention (arrow III in FIG. 2).

The sensor 12 has a bushing part 14 that is projecting transversely away from the support 1 and into which a plug of a corresponding sensor cable can be plugged. This bushing part 14 is also produced when injection molding the seal flange so that it must not be mounted separately on the support 1 of the seal flange. In the embodiment, the bushing part 14 has parallel extending straight wall sections 15, 16 (FIG. 3) which at their ends pass into each other by curved wall sections 17, 18.

The receiving part 14 has a bottom 19 from which contacts 20 are projecting away which are conductively connected with the electronic component group 13 and which are interacting with appropriate counter contacts of the plug of the sensor cable to be plugged into the bushing part 14.

The sensor 12 is arranged in such a way on the annular support 1 that it is located in the area adjacent to the dynamic seal 11. In this way, the sensor 12 can reliably interact with the trigger wheel of the crankshaft.

The shape of the bushing part 14 depends on the installation conditions in the vehicle. In the illustrated embodiment, the bushing part 14 is extending straight. For example, it can also be curved across its length, have a Z-shape, or be shaped in another way, depending on the existing installation conditions in the vehicle.

The bushing part 14 is projecting away from a base member 21 which in the illustrated embodiment has a greater cross section than the bushing part 14. The base member 21 extends approximately across the entire axial width of the support 1. The electronic component group 13 is located in the area of this base member 21 which is also projecting away transversely from the annular support 1 and is monolithically embodied together with it. As a result of the great cross section width of the base member 21, the electronic component group 13 is reliably protected. Since the electronic component group 13 during injection molding is embedded in the support 1 of the seal flange, an excellent radial, tangential, and axial positioning of the component group 13 results. Since it is embedded in the material of the seal flange, it is insensitive relative to vibrations and shocks. This contributes to a high measuring precision of the sensor 12.

The bushing part 14 and the base member 21 can also have the same or substantially the same cross section. In such a case, the component group 13 is reliably protected also.

Since the sensor 12 must not be retrofitted as a separate component on the seal flange or its support 1, no guides are required for the sensor which would cause interruptions in the wall section 10 and in the annular surface 9. As a result of the closed surfaces 9, 10, no deposits can form in the cavities and the like, as they are found in conventional seal flanges where the sensor 12 is screwed onto the support 1. Conversely, due to the closed surfaces 9, 10, it is ensured that no dirt particles can be pulled from the exterior into the interior of the seal flange.

These closed surfaces 9, 10 are in particular advantageous when testing for seal-tightness of the seal flange by means of an overpressure bell. With the overpressure bell, the seal-tightness of the seal flange is tested. It is attached to one end face of the seal flange in such a way that, about its circumference, it can rest seal-tightly against the annular surface 9 as well as the wall section 10 of the support 1. When overpressure is now applied by means of the overpressure bell, the overpressure must be maintained for a predetermined amount of time. When this is the case, then this is an indication of the seal-tightness of the seal flange. When however the overpressure drops within the predetermined measuring time, this indicates that the seal flange has leaks. Since the surfaces 9, 10 are closed, the seal-tightness test can be performed in a simple and reliable way. When a pressure loss occurs within the predetermined measuring time, it can be reliably assumed that the seal flange is leaking. With the described configuration of the seal flange, the appearance of air leaks can be very precisely measured. In this way, it is possible therefore in an advantageous way to omit oiling of the crankshaft upon installation of the seal flange, which is required in conventional seal flanges with screwed-on sensor.

Since the electronic component group 13 is integrated into the support 1 of the seal flange, very precise results for rotary speed and position measurement of the crankshaft are obtained. This is so because the problems associated with a seal flange with screwed-on sensors are prevented as a result of the integrated sensor 12. Primarily, the assembly and manufacturing tolerances which lead to imprecise positions of the sensor relative to the trigger wheel of the crankshaft are eliminated. The position of the sensor circuitry in relation to the trigger wheel within the seal flange is very precise as well as insensitive to vibrations and shocks as a result of embedding into the material of the seal flange.

Due to the elimination of the separate sensor and the integration of the electronic component group 13 into the support 1 or the seal flange, not only the overall weight of the seal flange 12 is reduced but also additional assembly processes for connecting the sensor with the seal flange are obsolete. Therefore, the required connecting elements, such as screws, centering bushing, and threaded insert of metal that had been required up to now, are also obsolete. By eliminating these additional parts, a very cost-efficient manufacture of the seal flange is provided. Since the aforementioned connecting elements are comprised of metal, resources are saved due to embedding of the electronic component group 13 into the seal flange. Also, plastic material is saved because the sensor requires no separate securing device. The elimination of the sensor separately mounted on the seal flange also leads to a significant compactness of the seal flange. It requires therefore only little installation space and can therefore be installed advantageously in vehicles in which only little installation space for the seal flange is available. Also, the seal flange is characterized by minimal weight because the additional connecting elements required up to now for attachment of the sensor and made of metal are eliminated.

The seal flange with sensor 12 integrated by injection molding technology can be manufactured in any suitable size. Also, positioning of the sensor 12 on the seal flange can be selected as needed so that very different seal flanges for very different motor configurations can be employed. The component group 13 must only be positioned within the injection molding tool at the right location. In the subsequent injection molding process, the sensor 12 is then at the right location of the seal flange.

In the described embodiment, the sensor 12 is designed such that the sensor signal can be sent by cables to the motor control device. The signal transmission can however also be done wireless, for example, by radiocommunication.

What is claimed is:

1. A crankshaft seal flange comprising:
   a support comprised at least partially of a plastic material;
   the support comprising a passage with an inner wall;
   the support comprising at least one dynamic seal that extends about a circumference of the inner wall of the passage of the support;
   at least one sensor configured to detect a crankshaft rotary speed and a crankshaft position, wherein the at least one sensor is substantially comprised of an electronic component group embedded in the plastic material of the support;
   wherein the electronic component group is embedded in the plastic material of the support by injection molding the crankshaft seal flange.

2. The crankshaft seal flange according to claim 1, wherein the support has a first lateral face and a second lateral face, wherein the passage of the support comprises a circumferentially closed wall section adjoined by a circumferentially extending, flat annular surface disposed on the first lateral face of the support.

3. The crankshaft seal flange according to claim 2, wherein the electronic component group has a spacing from the inner wall of the passage of the support and the spacing is such that the at least one sensor interacts with a crankshaft trigger wheel.

4. The crankshaft seal flange according to claim 1, wherein the at least one sensor comprises a bushing part projecting away from the support, wherein the bushing part is configured to receive a plug of a sensor cable.

5. The crankshaft seal flange according to claim 4, wherein the at least one sensor comprises a base member from which the bushing part is projecting away, wherein the electronic component group projects into the base member.

6. The crankshaft seal flange according to claim 5, wherein the base member extends at least approximately across an axial width of the support.

7. The crankshaft seal flange according to claim 6, wherein the support comprises opposed lateral faces and at least one static seal disposed on one of the opposed lateral faces.

8. The crankshaft seal flange according to claim 1, wherein the plastic material of the support is a high-performance thermoplastic material or a thermosetting resin.

9. The crankshaft seal flange according to claim 1, wherein the at least one sensor sends sensor signals by cable or wireless to a control device.

10. The crankshaft seal flange according to claim 9, wherein the control device is a motor control device.

\* \* \* \* \*